Patented June 24, 1947

2,423,033

UNITED STATES PATENT OFFICE 2,423,033

RECLAIMING SYNTHETIC RUBBERS WITH A FATTY ACID AND LIVE STEAM

Rée Vilma le Beau, Cambridge, Mass., assignor, by mesne assignments, to Midwest Rubber Reclaiming Company, East St. Louis, Ill., a corporation of Delaware No Drawing. Application July 24, 1944, Serial No. 546,428

7 Claims. (Cl. 260—23)

This application is a continuation in part of my original application, Serial No. 403,373, filed July 21, 1941.

My present invention relates to reclaiming fully or partly vulcanized or scorched synthetic rubbers to make them more useful technically and provides a single identical process which will reclaim scrap rubbers of the group consisting of polymerized conjugated diolefines and their copolymers and chloroprene polymers. The presence of vulcanized natural rubber in the scrap does not interfere with the operation of the process.

At the present time it is very important to be able to reclaim such rubbers.

Heretofore natural rubbers have been reclaimed by several processes, for instance, by the use of alkalies and oils at high pressures and temperatures; by the use of acids also under high pressures and temperatures; and to some extent by digestion in rubber solvents. Attempts have also been made to bring synthetic and natural rubbers to a reworkable condition by working them mechanically for a long time with large proportions of plasticizer, but the results have been unsatisfactory. So far it has not been possible to reclaim synthetic rubbers of the group consisting of polymerized conjugated diolefines and their copolymers and chloroprene polymers successfully, much less has it been thought that any single process could be devised to reclaim the several types simultaneously, since they have different chemical and physical characteristics. As far as I have been able to ascertain, no successful and economically practical process of reclaiming such synthetic materials has been devised and it may well have been assumed that none could be.

As is well known to those skilled in the art, "neoprene," which is a trade name for polymerized chloroprene,

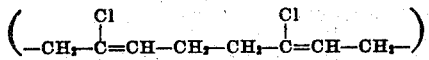

is not in general compatible in vulcanization with natural rubber or with other synthetic rubbers, probably owing to the presence and effect of the chlorine which it contains in its molecule. However, when vulcanized neoprene is treated in accordance with the process herein described it becomes not only vulcanizable with sulphur, in the same way as are natural and other synthetic rubbers, but also it becomes compatible with them without losing its peculiar characteristics, such as resistance to oil and aging. Likewise mixtures of the several rubbers may be simultaneously reclaimed by the same process.

Polymerized conjugated diolefines and their copolymers which will vulcanize with sulphur may also be treated by exactly the same method.

My present invention is based on three discoveries. First, that certain substances, when mixed with scrap of the various types already mentioned and subjected to live steam under proper conditions, have the effect of bringing the scrap back into condition in which it can be again successfully processed.

Second, that, when treated with the reclaiming substance, vulcanized neoprene becomes vulcanizable with sulphur in the same way as are natural or other synthetic rubbers; that it does not lose its individual characteristics, such as resistance to oil and aging, and that it becomes compatible with natural or other synthetic rubbers with which in the unreacted state it was not compatible.

Third, that suitable treating substances are (1) long chain saturated fatty acids having from 4 to 18 carbon atoms and which do not contain hydroxyl groups in the chain other than those in the carboxyl groups, and (2) certain organic amines described in my copending application Serial No. 471,882, filed January 9, 1943, which is a continuation of application Serial No. 403,372, filed July 21, 1941.

The work which I have done proves conclusively that unsaturated fatty acids and short chain saturated fatty acids are ineffective, while long chain saturated fatty acids having from 4 to 18 carbon atoms and which do not have hydroxyl groups in the chain other than those in the carboxyl groups are effective when used in amounts of from 3 to 35%, depending on the degree of vulcanization of the scrap to be treated.

My present invention includes both the method of reclaiming fully or partially vulcanized or scorched synthetic materials of the kind described and the resulting product which appears to be an altogether new substance or compound. The claims of the present application are limited to the use of long chain saturated fatty acids of the kinds already mentioned and the products resulting therefrom, while in my said companion application Serial No. 471,882 I have claimed the method of reclaiming by the use of the organic amines defined therein and the products resulting therefrom.

When using the acids as reclaiming agents, I find that it is desirable to mix the acid with a solvent therefor, the solvent being also capable of swelling the scrap, and then to mix thoroughly the scrap with this solution. When this is done, the solvent may, if desired, be evaporated from the mixture before the mixture is treated with live steam, or the solvent may be left in the mix during the treatment. The solvent carries the acid into the material more perfectly than is the case where no solvent is used. The fact that the reaction may be carried out effectively after the solvent has been removed shows that the acid rather than the solvent is the active reclaiming agent.

In this application I have used the word "solvent" to include those substances which are solvents of the particular acid employed and which are also capable of swelling the material which is being processed.

My invention will be understood from the following specific examples:

The scrap is first ground into small particles such as is customary in the rubber reclaiming industry.

EXAMPLE 1

900 grams of scrap (vulcanized neoprene scrap, vulcanized Ameripol scrap, or vulcanized German buna scrap, or vulcanized Thiokol, polyalkylene polysulfide, scrap)
32 grams (i. e. 3.55% of the weight of the scrap) of lauric acid, $CH_3(CH_2)_{10}COOH$
300 grams of solvent naphtha

*Mixing procedure*

The lauric acid is dissolved in the solvent and the solution added to the scrap while stirring the latter so that a thorough wetting of the particles is obtained. The mixture is then subjected to a treatment in a pot heater during 5 hours at 190 lbs. live steam pressure. After the pressure has been released the scrap is ready for milling. It will form a sheet immediately, can be refined, recompounded and recured without any difficulties.

It may also be said that Ameripol scrap is stated to be a copolymer of butadiene and acrylonitrile or styrene; and that German buna includes polymers of butadiene and copolymers of butadiene and styrene, and of butadiene and acrylonitrile.

EXAMPLE 2

900 grams of neoprene G. N. tire scrap
32 grams (i. e. 3.55% of the weight of the scrap) of stearic acid, $CH_3(CH_2)_{16}COOH$
300 grams of trichlorethylene

*Mixing procedure*

The stearic acid is dissolved in the solvent and the solution added to the scrap while stirring the latter so that a thorough wetting of the particles is obtained. Then about 2000 grams of water are added and the whole mixture placed in a digester or autoclave. The amount of water will depend on the particular digester used for this purpose and must not only suffice to keep the scrap in a moist condition throughout the treatment but also be large enough to allow the desired pressure to be built up. In this case the scrap was subjected to a pressure of 200 lbs. during 5 hours. The pressure was then released, the digester opened and the scrap washed and dried. The scrap was then ready for milling and refining as well as recompounding and recuring.

In the following examples the scrap employed and the mixing procedure were the same as has been described in connection with Example 2.

EXAMPLE 3

100 grams scrap
25 grams caproic acid, $C_5H_{11}COOH$

Treat for 9 hours with live steam at 190 lbs. pressure.

EXAMPLE 4

100 grams scrap
25 grams caprylic acid, $C_7H_{15}COOH$
20 grams solvent naphtha Treat for 12 hours with live steam at 150 lbs. pressure.

EXAMPLE 5

100 grams scrap
15 grams myristic acid, $C_{13}H_{27}COOH$
25 grams trichlorethylene Treat for 18 hours with live steam at 100 lbs. pressure.

EXAMPLE 6

100 grams scrap
3 grams stearic acid, $C_{17}H_{35}COOH$
10 grams solvent naphtha Treat for 8 hours with live steam at 200 lbs. pressure.

EXAMPLE 7

100 grams scrap
25 grams stearic acid, $C_{17}H_{35}COOH$
30 grams trichlorethylene Treat for 5 hours with live steam at 200 lbs. pressure.

EXAMPLE 8

100 grams scrap
25 grams lauric acid
20 grams solvent naphtha

Treat for 5 hours with live steam at 200 lbs. pressure.

EXAMPLE 9

100 grams scrap
3 grams lauric acid
10 grams trichlorethylene

Treat for 6 hours with live steam at 190 lbs. pressure.

EXAMPLE 10

100 grams scrap
35 grams stearic acid
20 grams solvent naphtha

Treat for 5 hours with live steam at 200 lbs. pressure.

EXAMPLE 11

100 grams scrap from a whole tire having a natural rubber carcass and a butadiene-styrene copolymer tread stock
20 grams stearic acid, $C_{17}H_{35}COOH$
30 grams solvent naphtha Treat for 8 hours with live steam at 200 lbs. pressure.

The time and pressure of the treatment in either pot-heater or digester will depend on the particular scrap used. Also the amount of treating agent to be used is a function of the particular scrap to be reclaimed and will vary between 3 and 35% of the weight of the scrap depending on the desired properties to be obtained. In general it may be said that the tighter the cure of the scrap the larger the proportions of the reclaiming agent required.

While it will be understood that the usual softeners can be added during or after the reclaiming process, I prefer not to do so as it interferes with the physical properties of the final product. Likewise it will be understood that the usual fillers, accelerators and other compounding ingredients may be employed subsequently to the reclaiming process.

The result of my reclaiming process is to convert the crumb-like, granular, non-coherent scrap, which is incapable of being worked on a rubber mill, into a coherent tacky mass which can be converted into a smooth sheet immediately when being worked. My process described herein makes it possible to convert the crumb-like, granular scrap into a continuous sheet with relatively small force and consequently with the expenditure of a relatively small amount of power and time.

In the examples, the mixture is subjected to live steam pressure for different lengths of time which vary for different treating agents and different waste materials. The above examples show the times, temperatures and pressure which are used for the particular mixtures in question, but other combinations of times, temperatures and pressures are possible for other mixtures.

In the foregoing description and examples, I have described the novel processes to be employed in accordance with my invention in reclaiming fully or partly vulcanized or scorched materials without reference to whether the scrap never contained fibers, or has been defibered, or still contains fibers from fabric or textile cords such as are usually found in commercial rubber scrap because the presence of fiber does not interfere with the action of the reclaiming substance. Accordingly, in the claims I do not limit myself to the treatment of scrap which does not contain textile fibers.

I claim:

1. That step in the manufacture of reclaimed previously vulcanized rubbery synthetic polymers selected from the group consisting of polymers and copolymers of butadiene and chloroprene polymers and mixtures thereof which comprises heating such materials by contact with live steam in the presence of three to thirty-five percent of a saturated fatty acid having from six to eighteen carbon atoms and which does not contain hydroxyl groups in the chain other than in the carboxyl groups and a solvent for the acid which swells the rubber.

2. A process according to claim 1 wherein the polymers are chloroprene polymers.

3. A process according to claim 1 wherein the polymers are butadiene polymers.

4. A process according to claim 1 wherein the fatty acid is stearic acid.

5. A process according to claim 1 wherein the fatty acid is lauric acid.

6. A polychloroprene having been reclaimed by the process of claim 1, said reclaimed material being vulcanizable with sulphur.

7. A mixture of polychloroprene and butadiene polymers having been reclaimed by the process of claim 1, said reclaimed material being vulcanizable with sulphur.

RÉE VILMA LE BEAU.

REFERENCES CITED

The following references are of record in the file of this patent:

UNITED STATES PATENTS

| Number | Name | Date |
|---|---|---|
| 2,343,558 | Kirby et al. | Mar. 7, 1944 |
| 2,324,980 | Kilbourne | July 20, 1943 |
| 2,280,484 | Gumlich | Apr. 21, 1942 |
| 2,273,506 | Bachle | Feb. 17, 1942 |
| 2,154,894 | Essex | Apr. 18, 1939 |
| 2,278,826 | Castello et al. | Apr. 7, 1942 |
| 1,171,187 | Glidden | Feb. 8, 1916 |
| Re. 2,206 | McBurney | Mar. 20, 1866 |
| 2,338,427 | Gumlich | Jan. 4, 1944 |

OTHER REFERENCES

"Chem. Ind.," June 1942, p. 772.